(12) United States Patent
Begg et al.

(10) Patent No.: US 7,900,195 B2
(45) Date of Patent: *Mar. 1, 2011

(54) SYSTEM FOR BOUNDARY TRACE WITH REPRODUCTION FACILITY

(75) Inventors: Robert Alan Begg, Scarborough (CA); Murray Frederick Chislett, Scarborough (CA); Albert Grankin, Scottsdale, AZ (US); John Paul Parkin, Aurora (CA); Edward Van Gennip, Toronto (CA); Mark Francis Wilding, Barrie (CA)

(73) Assignee: International Business Machines Corporation, Armonk, NY (US)

( * ) Notice: Subject to any disclaimer, the term of this patent is extended or adjusted under 35 U.S.C. 154(b) by 222 days.

This patent is subject to a terminal disclaimer.

(21) Appl. No.: 12/348,577

(22) Filed: Jan. 5, 2009

(65) Prior Publication Data
US 2009/0119645 A1   May 7, 2009

Related U.S. Application Data

(63) Continuation of application No. 10/874,617, filed on Jun. 22, 2004, now Pat. No. 7,496,901.

(51) Int. Cl.
*G06F 9/44* (2006.01)
(52) U.S. Cl. .................. 717/128; 717/130; 717/131; 719/313; 719/315; 719/318
(58) Field of Classification Search .......... 717/135, 717/129; 171/128
See application file for complete search history.

(56) References Cited

U.S. PATENT DOCUMENTS

| 5,146,460 | A  | 9/1992  | Ackerman et al. |
|-----------|----|---------|-----------------|
| 5,317,740 | A  | 5/1994  | Sites |
| 5,581,780 | A  | 12/1996 | Kaplan et al. |
| 5,604,851 | A  | 2/1997  | Taylor |
| 5,898,873 | A  | 4/1999  | Lehr |
| 6,182,244 | B1 | 1/2001  | Bankemper et al. |
| 6,230,313 | B1 | 5/2001  | Callahan, II et al. |
| 6,282,701 | B1 | 8/2001  | Wygodny et al. |
| 6,507,805 | B1 | 1/2003  | Gordon et al. |
| 6,513,155 | B1 | 1/2003  | Alexander, III et al. |
| 6,611,955 | B1 | 8/2003  | Logean et al. |
| 6,694,507 | B2 | 2/2004  | Arnold et al. |
| 6,804,814 | B1 | 10/2004 | Ayers et al. |
| 6,823,355 | B1 | 11/2004 | Novaes et al. |
| 2002/0138753 | A1 | 9/2002 | Munson |
| 2005/0028145 | A1 | 2/2005 | Kang et al. |

(Continued)

OTHER PUBLICATIONS

Internal Debugg Feature in Diagnostic Control Program; IBM Technical Disclosure Bulletin, vol. 39, No. 12; Dec. 1996.

(Continued)

*Primary Examiner*—Wei Y Zhen
*Assistant Examiner*—Matthew J Brophy
(74) *Attorney, Agent, or Firm*—Sughrue Mion PLLC

(57) ABSTRACT

Disclosed herein is a data processing system-implemented method, a data processing system, and an article of manufacture for investigating computer software. The data processing system-implemented method includes capturing tracing information at one or more boundary points of the computer software, and reproducing a behavior of the computer software at the boundary points based on the captured tracing information.

12 Claims, 6 Drawing Sheets

U.S. PATENT DOCUMENTS

2005/0091643 A1    4/2005    Ekanadham et al.

OTHER PUBLICATIONS

Shende, S., et al.; Event and State-Based Debugging in TAU: A Prototype, SPDT, 1996, Philidelphia, PA, USA 1996, ACM pp. 21-30.

Mittal, N., et al.; Debugging Distributed Programs Using Controlled Re-execution, PODC 2000, Portland, Oregon, ACM 2000 pp. 239-248.

Cook, J.E.; Discovering Models of Software Processes from Event-Based Data. ACM Transactions on Software Engineering and Methodolgy, vol. 7, No. 2, Jul. 1998, pp. 215-249.

Kashimoto, T. et al., Function Points Analysis for Requirements Specification Based on Event Trace Diagrams, John Shori Gakkai Ronbunshi (Transactions of the Information Processing Society of Japan) vol. 41, Issue 6, Jun. 2000 pp. 1895-1904, Abstract in English.

Hercksen, U. et al., Measuring Simultaneous Events in a Multiprocessor System, ACM Sigmetrics Conference on Measurement and Modeling of Computer Systems, Seattle, Aug. 30-Sep. 1982, vol. 11, Issue 4, pp. 77-88.

Brock, G., Trace Functions Speed Software Tracking in Microsystems, Electronics Test, Apr. 1983, vol. 6, No. 4, pp. 48-56.

SYSTEM FOR BOUNDARY TRACE WITH REPRODUCTION FACILITY

CROSS REFERENCE TO RELATED APPLICATION

This application is a divisional of U.S. patent application Ser. No. 10/874,617 filed Jun. 22, 2004, the disclosure of which is incorporated herein by reference in its entirety.

TECHNICAL FIELD

The present invention relates to computer software, and more specifically, the present invention relates to a data processing system-implemented method, a data processing system and an article of manufacture (such as a computer program product) for investigating computer software.

BACKGROUND

Many software systems such as information retrieval systems, database engines and database management systems (DBMSs) have a complex multi-layer software configuration. When developing software systems, it is often important to investigate or test the software product to discover problems or improve operation. Typically, tracing facilities are used to make simpler the process of determining problem origination or to understand the behavior of software over time. Such tracing facilities can be integrated with a software system during software testing or development and can be used for tracing the code path (i.e. which specific functions and parts of functions were called), tracing data (e.g., a network trace), tracing events and tracing the interface between two layers of software (i.e. the boundary).

For most types of software problems, it is useful to narrow down the scope of the problem. Narrowing down the scope reduces the complexity of the software system, making it easier to diagnose. Typically, in order to narrow down the problem, pieces of software or parts of a software system are removed or decoupled, at least temporarily, to eliminate components that do not cause problems.

For software products that have a multilayer structure, it may be difficult to test specific layers of code because the layers often rely heavily on each other. For example, if a software product has three layers, testing a middle layer may be difficult. The middle layer may require support from a top and/or bottom layer to execute. Because of this, it is common to use the top layer to drive the middle and lower layers. Testing the middle layer may cause unwanted and duplicate testing of the top and bottom layers, which increases the testing time for the middle layer. As large software systems normally contain many layers, testing dramatically increases this problem.

A further problem common to some cases in which software systems hang and fail to respond to any interaction arises because investigating can be a difficult task when multiple software products or components are involved. The problems that cause a hang, or other abnormal end, can be buried deep within a software system or can even be caused by circular dependencies of software system components.

Yet another problem is related to tracing of specific events within the software product. Such tracing may include errors but usually includes significant events in the software product. Even though event traces are useful, existing software systems do not provide a good overall view of behavior of all software products.

A solution to some or all of these shortcomings is therefore desired.

SUMMARY

In accordance to one aspect of the present invention there is provided a data processing system-implemented method for directing a data processing system to investigate computer software, the data processing system-implemented method including capturing tracing information at one or more boundary points of the computer software, and reproducing a behavior of the computer software at the boundary points based on the captured tracing information.

In accordance to another aspect of the present invention there is provided an article of manufacture for directing a data processing system to investigate computer software, the article including a program usable medium embodying one or more executable data processing system instructions, the executable data processing system instructions including executable data processing system instructions for capturing tracing information at one or more boundary points of the computer software, and executable data processing system instructions for reproducing a behavior of the computer software at the boundary points based on the captured tracing information.

In accordance to yet another aspect of the present invention there is provided a data processing system for investigating computer software, the data processing system including a tracing module for capturing tracing information at one or more boundary points of the computer software, and a reproducing module reproducing a behavior of the computer software at the boundary points based on the captured tracing information.

BRIEF DESCRIPTION OF THE DRAWINGS

Further features and advantages of aspects of the present invention will become apparent from the following detailed description, taken in combination with the appended drawings, in which.

DETAILED DESCRIPTION

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the C or C++ computer programming language (or other computer programming languages in conjunction with C/C++). Any limitations presented would be a result of a particular type of operating system, data processing system, or computer programming language, and thus would not be a limitation of the present invention.

Figure 1:
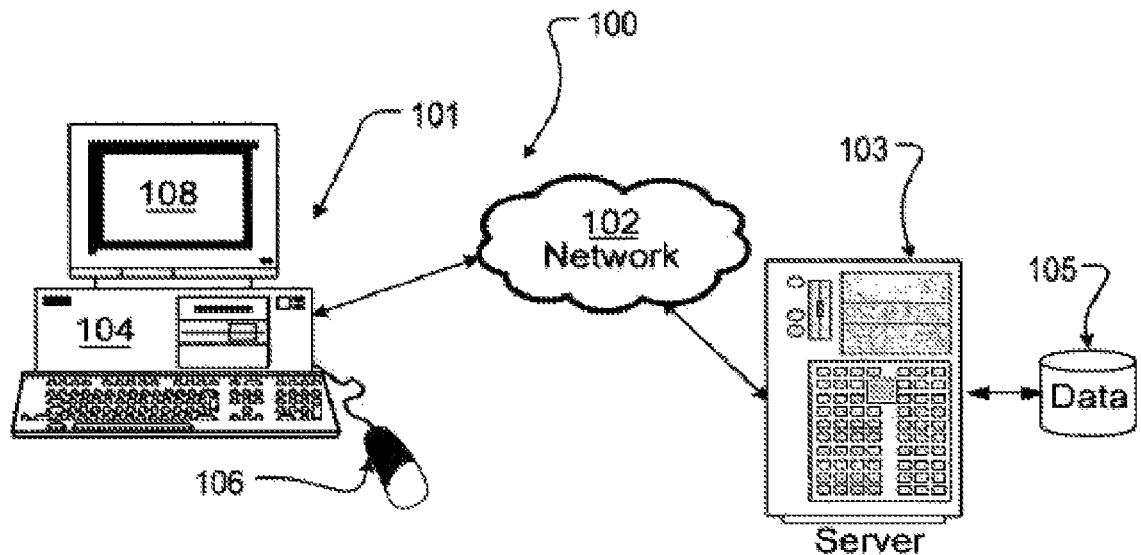
FIG. 1 schematically illustrates an embodiment of the present invention as a computer system having a processing system.

An embodiment of the invention, computer system 100, is illustrated in FIG. 1. Computer system 100, which is illustrated for exemplary purposes as two computing devices 101 and 103, is adapted to communicate with each other and other computing devices (not shown) using network 102. As will be appreciated by those of ordinary skill in the art, network 102 may be embodied using conventional networking technologies and may include one or more of the following: local networks, wide area networks, intranets, the Internet, and the like.

Throughout the description herein, an embodiment of the invention is illustrated with aspects embodied on two computers in computer system 100, comprising a client computer 101 and an information retrieval system computer 103 including a database engine coupled to a database. As will be appreciated by those of ordinary skill in the art, aspects of the invention may be embodied in a single computing device or distributed amongst two or more coupled computing devices which interact using one or more networks such as, for example, network 102.

Computing devices such as device 101 typically includes a processing system 104 which is enabled to communicate with the network 102, and various input devices 106 and output devices 108. Input devices 106, (a keyboard and a mouse are shown) may also include a scanner, an imaging system (e.g., a camera, etc.), or the like. Similarly, output devices 108 (only a display is illustrated) may also include printers and the like. Additionally, combination input/output (I/O) devices may also be in communication with processing system 104. Examples of conventional I/O devices (not shown in FIG. 1) include removable recordable media (e.g., floppy disk drives, tape drives, CD-ROM drives, DVD-RW drives, etc.), touch screen displays, and the like.

Figure 2:
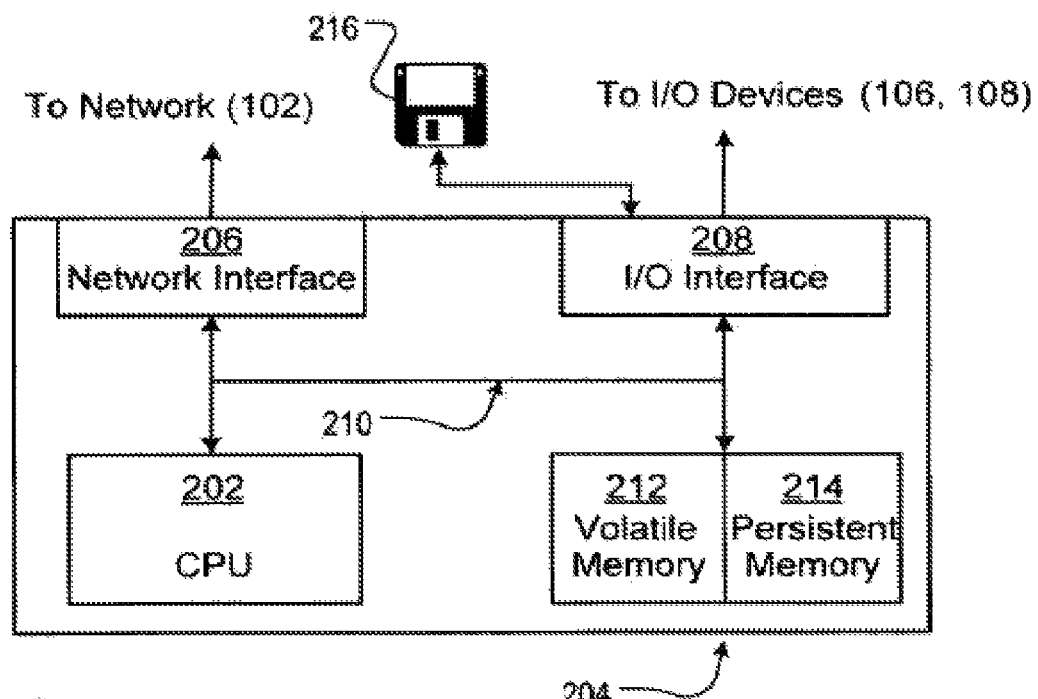
FIG. 2 schematically illustrates in greater detail the processing system of FIG. 1.

Exemplary processing system 104 is illustrated in greater detail in detail in FIG. 2. As illustrated, processing system 104 includes a central processing unit (CPU) 202, memory 204, network interface (I/F) 206 and input-output interface (I/O I/F) 208. Communication between various components of the processing system 104 may be facilitated via a suitable communications bus 210 as required.

CPU 202 is a processing unit, such as an Intel Pentium™, IBM PowerPC™, Sun Microsystems UltraSparc™ processor, or the like, suitable for the operations described herein. As will be appreciated by those of ordinary skill in the art, other embodiments of processing system 104 could use alternative CPUs and may include embodiments in which two or more CPUs are employed (not shown). CPU 202 may include various support circuits to enable communication between itself and the other components of processing system 104.

Memory 204 includes both volatile memory 212 and persistent memory 214 for the storage of operational instructions for execution by CPU 202, data registers, application and thread storage, and the like. Memory 204 preferably includes a combination of random access memory (RAM), read only memory (ROM), persistent memory such as that provided by a hard disk drive, flash memory or the like.

Network I/F 206 enables communication between other computing devices (not shown) and other network computing devices via network 102. Network I/F 206 may be embodied in one or more conventional communication devices. Examples of a conventional communication device include an Ethernet card, a token ring card, a modem, or the like. Network I/F 206 may also enable the retrieval or transmission of instructions for execution by CPU 202, from or to a remote storage media or device via network 102.

I/O I/F 208 enables communication between processing system 104 and the various I/O devices 106 and 108. I/O/F 208 may include, for example, a video card for interfacing with an external display such as output device 108. Additionally, I/O I/F 208 may enable communication between processing system 104 and a removable media 216. Removable media 216 may comprise a conventional diskette or other removable memory devices such as Zip™ drives, flash cards, CD-ROMs, static memory devices, and the like. Removable media 216 may be used to provide instructions for execution by CPU 202 or as a removable data storage device.

Figure 3:
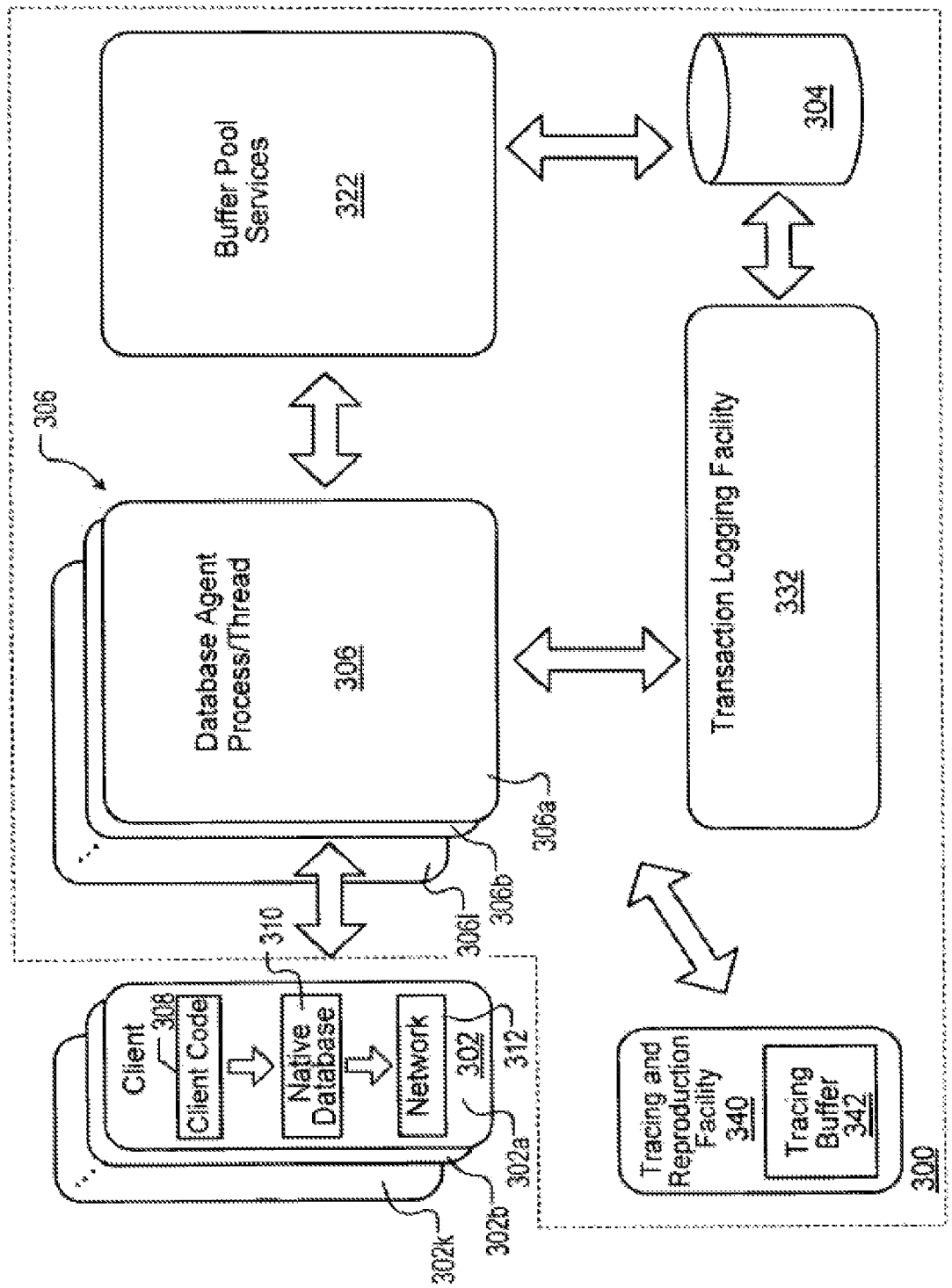
FIG. 3 illustrates, in functional block form, computer instructions/applications (operations for directing the processing system) stored in memory of the processing system of FIG. 2.

Computer instructions/applications stored in the respective memories 204 of computing devices 101 and 103 and executed by respective CPUs 202 (thus adapting the operation of each computing device of system 100 as described herein) are illustrated in functional block form in FIG. 3. As will be appreciated by those of ordinary skill in the art, the discrimination between aspects of the applications illustrated as functional blocks in FIG. 3 is somewhat arbitrary in that the various operations attributed to a particular application as described herein may, in an alternative embodiment, be subsumed by another application. For example, a data processing system for investigating computer software may comprise modules, such as, for example, a tracing module for capturing tracing information at one or more boundary points of the computer software, and a reproducing module reproducing a behavior of the computer software at the boundary points based on the captured tracing information.

As illustrated for exemplary purposes only, each memory 204 stores instructions and data for enabling operations for full boundary trace with event trace points in an exemplary client/server RDBMS environment. Each memory 204 comprises an operating system (OS) (not shown) and a communication suite (not shown) as well as respective client and server components for the RDBMS application. It will be understood to persons skilled in the art that these respective components comprise multiple layers of software and are thus candidates for the present invention. However, other software components may also be adapted by the present invention for investigation.

The OS is an operating system suitable for operation with selected CPU 202 and the operations described herein. Multitasking, multi-threaded OSes such as, for example, IBM AIX™, Microsoft Windows 2000™, Linux™ or the like, are expected to be preferred in many embodiments.

The communication suite provides, through interaction with the OS and network I/F 206 (FIG. 2), suitable communication protocols to enable communication with other networked computing devices via network 102 (FIG. 1). The communication suite may include one or more of such protocols such as TCP/IP, Ethernet, token ring, and the like. The communications suite preferably includes asynchronous transport communication capabilities for communicating with other computing devices.

FIG. 3 illustrates an embodiment of the invention implemented in a client side 302 and server-side RDBMS 300 software application for information retrieval adapted to include tracing and reproduction facilities. RDBMS 300 is a software application executable in the environment of the OS in order serve requests from client applications 302a, 302b ... 302k (collectively, client applications 302) to create, retrieve or modify data stored in a database 304. The database 304 is typically stored in persistent memory 214 or in another persistent storage coupled to computer system 100. Client applications 302 are executed by computing device 101 of system 100 or on other computer devices adapted to communicate with computer system 100, using network 102 for example. Each client application 302 is associated with a respective agent process or a thread, which serves client application requests during a connection session with RDBMS 300. For illustrative purpose agent processes 306a, 306b ... 306l (agent process 306 are illustrated collectively). Each agent process 306 typically parses, compiles and optimizes respective client requests for data retrieval. Typically, client processes 302 and agent processes 306 are implemented using a multilayer software structure. Client application 302 may comprise an application business logic and presentation layer 308, a native database layer 310, and a network driver layer 312. Persons of ordinary skill in the art will understand that this client application arrangement is but one of many forms and the specific structure thereof is not material to the invention herein. Agent process 306 may comprise (though not shown) a query execution/access layer, a SQL parser, an optimizer and results processing layers and a network layer.

As will be appreciated by those of ordinary skill in the art, RDBMS 300 may employ a buffer pool service (BPS) 322 in order to minimize disk access and/or network traffic flow to manage data access from database 304. RDBMS 300 may also comprise a transaction logging facility (TLF) 332 adapted to interact with agent processes 306, buffer pool services 322 and database 304. TLF 332 may record data changes performed by agent processes 306. Database 304 is a collection of various hardware devices, which physically store database data and transaction logs. Persons of ordinary skill in the art will understand that the structure of RDBMS thus described is but one of many forms and the specific structure thereof is not material to the invention herein.

RDBMS 300, client 302 or both may require investigating or testing in order to identify problems that may occur during execution. In accordance with an embodiment of the invention, in order to perform investigations, RDBMS 300 comprises tracing and reproduction facility 340 including tracing buffer 342. Though not shown in FIG. 3, client applications may similarly be configured with a tracing and reproduction facility.

Tracing facility 340 comprises a tracing buffer 342, which is useful to store trace information describing the state of database agent processes 306 or any other components involved in operations of RDBMS 300. The state of agent process 306 includes an identifier indicating a name or type of a currently performed command or operation and in/out data associated with the command. For example, if a client application 302 sends data to RDBMS 300 and is waiting for a response, the state would be "waiting for response from RDBMS" and the associated data includes enough information to describe uniquely the RDBMS 300 within the scope of the client application environment.

In the present embodiment, tracing and reproduction facility 340 may be enabled to reproduce the behavior of RDBMS 300 or of specific parts of RDBMS 300, using the information accumulated by tracing and reproduction facility 340 during tracing operations. The behavior of a specific component of software adapted in accordance with the invention can be reproduced without the need for the original environment.

In accordance with an aspect of the invention employing tracing and reproduction facility 340, the invention provides a mechanism to capture sufficient information in a trace to reproduce a problem in a software layer which is driven by a higher software layer and that drives a lower software layer. For example, for a computer system 100 having a software layer used for client access to the database, the invention can capture both the API for the client software layer as well as the communication with the database engine. To reproduce the problem, the invention can call the specific functions in the client software layer that were called in the trace as well as respond in the same way that the database engine responded to these functions. This allows a complete reproduction of the client layer behavior without the need for a database engine or the customer's database layout. Similarly, the client software layer could be removed from an investigation of the database engine by replacing it with the invention (the invention would make the same requests of the database engine on behalf of the client software layer and would generally behave like the client software).

Another feature of the invention is that software adapted via tracing and reproduction facility 340 provides a mechanism to test specific layers of software quickly and efficiently. Using the example above, the invention could single out the client software layer for testing and respond quickly and immediately in the same way as a RDBMS. Since there is no need to communicate with a RDBMS in a test of software on the client computer, tests can be performed quickly and can improve the testing efficiency.

A further feature of the current invention is that employing tracing and reproduction facility 340 provides a mechanism to keep track of the current action of a thread and/or process. The same boundary points in the software to be traced can be used to update a status variable which includes the current action of a thread or process.

Boundary points may be, for example, layer or control boundary points in a multilayer software application. State information describing a state of action of said software at each boundary point may be also be captured. A reproduction mechanism is provided to reproduce the behavior of the software at the boundary points in response to tracing information captured for the boundary points.

For example, if a thread in a client application layer sends a request to a RDBMS and waits for a response, the status may be "waiting for response from server". Similarly, if one database engine thread/process is waiting for another database engine thread/process, the invention could provide enough information to determine a) which thread/process is simply waiting; b) which thread/process is the waiting process/thread waiting for; and c) why the waiting thread/process is waiting. This information could in turn be used to "unravel" a software problem such as a cause of a hang and potentially to recover from it.

The invention provides a useful conceptual trace of a software product adapted by the invention. The invention also provides a useful trace for both customers and support teams to understand the behavior of the software product. The conceptual trace includes two main types of trace points: boundary trace points, and event trace points. Boundary trace points define a change in control between one thread/process and another, a change in software layer, or a significant change in behavior. Event trace points simply denote important events in the software product.

The invention adapts software to be investigated primarily about boundary control points in the software. In accordance with an embodiment of the invention, boundary points take one of three various forms, namely synchronous and asynchronous control boundary points and layer boundary. Control boundary points represent a change in control between one thread/process and another thread/process. For example, if one thread/process (known as a 'task' from now on) sends a request to another task and it has to wait for the response, then this may be considered a control boundary point. If the requesting task is required to wait for a response from the other task, then this would be considered a synchronous control boundary point. If the requesting task can perform other work while waiting but still needs to receive a response from the other task, this is considered an asynchronous boundary point. The invention can use these to help detect software hangs and to produce a useful conceptual view of the software behavior.

Figure 4:
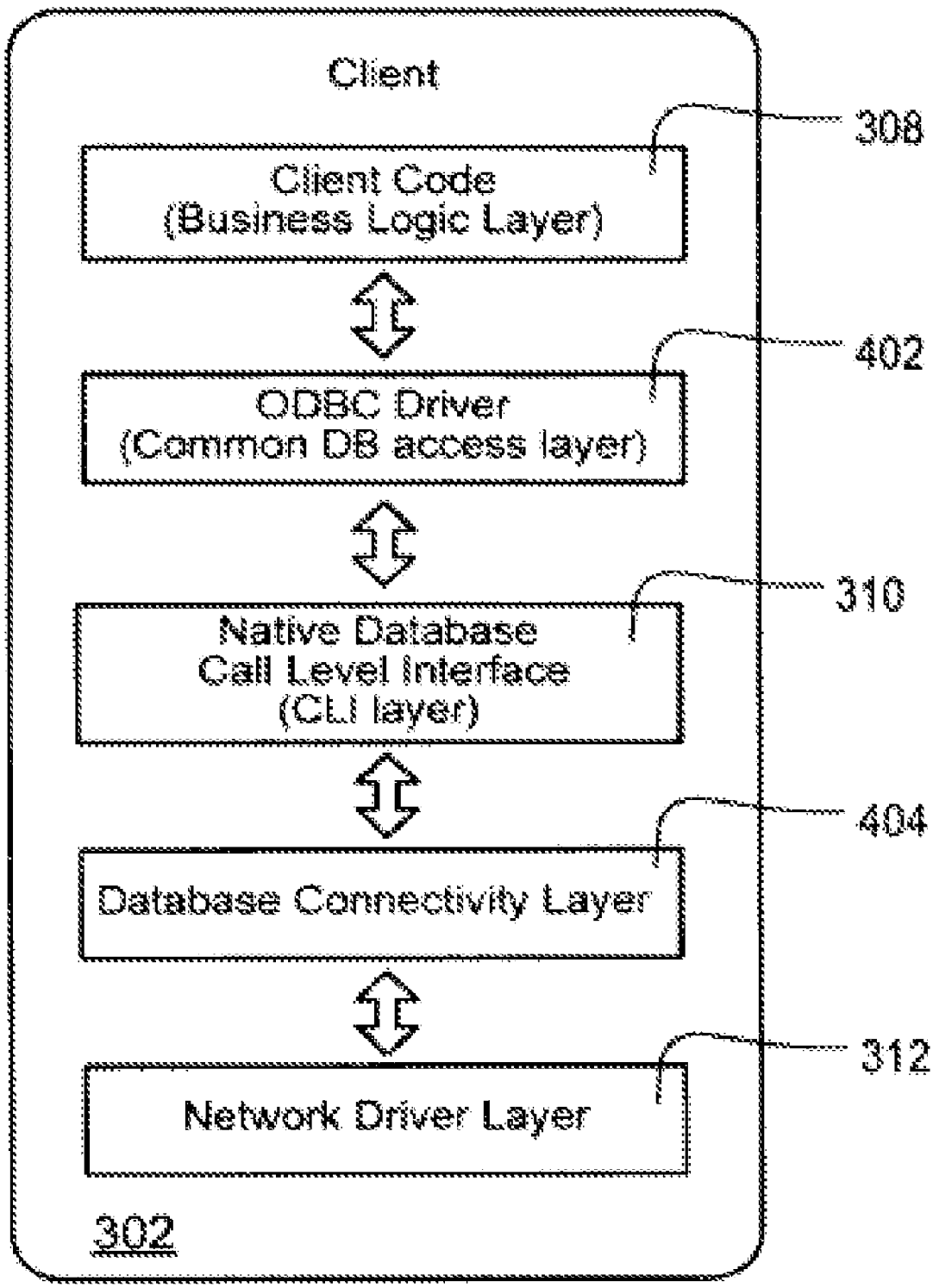
FIG. 4 illustrates an example of a layered software application, namely the structure of a client application stored in the memory of FIG. 2.

A layer boundary point occurs when the task continues to run but transfers from one software layer to another. The invention can use layer boundary points to narrow down problems to a specific layer of software and to reproduce problems by calling the functions listed in the trace with the same arguments that were used when the trace was active. FIG. 4 demonstrates layer boundary points in a software client application.

FIG. 4 illustrates an example of a layered software application (to be stored in memory of the computer system in FIG. 2), namely the structure of client application 302 in detail. Client application 302 comprises application business logic and presentation layer 308, native database layer 310, network driver layer 312, open database connectivity (ODBC) driver layer 402 and database connectivity layer 404. In this example, to receive information from RDBMS 300, application business logic and presentation layer 308 calls ODBC (Open Database Connectivity) layer 402 library functions to communicate with database 304. ODBC layer 402 is an abstract set of functions, which allows client applications using the same methods to communicate with databases from different vendors (IBM, Microsoft, Oracle etc.). ODBC layer 402 calls a native database library layer (CLI) 310, in order to translate client requests into requests for specific vendor RDBMS 300. CLI or call level interface library layer 310 in turn calls a database connectivity layer 404 to route requests to RDBMS 300. Database connectivity layer 404 calls network driver functions layer 312, to send and receive the data of computer system 100 where RDBMS 300 is run. The layer boundaries that can be used for tracing can thus be defined by the existing layer structure of client application 302 and RDBMS 300.

The invention may also adapt software for investigation about event points in the software.

Synchronous control boundary points (SCBP) tracing mode provides a useful, human consumable trace that describes the execution flow of control of a software product. This trace typically does not provide intermediate details but will show the points in the execution of the software product where tasks transferred control between each other. If a problem or hang occurs, a synchronous boundary trace will show which task was in control and which tasks were idle during the problem. Information recorded for a SCBP preferably contains sufficient information (in the form of a correlation ID, for example) to identify which task is transferring control, which task is gaining control of the execution and which logical object (e.g. a mutex) will be used to wait on.

Asynchronous control boundary points (ACBP) include situations where one task makes one or more requests from another task but does not need to stop executing while the requests are fulfilled. An ACBP is useful to show work done by one task that is on behalf of another task. If that work fails, it will likely cause problems for the task waiting for the results. If the work does not complete, then the requesting task will also experience problems of some sort. If the requesting task decides to wait for the work be completed (after performing some work of its own), it preferably uses a SBCP to denote that it is now waiting for the other task be completed.

If data is transferred between two tasks, that information can also be captured with a SCBP or ACBP to ensure that the invention can show this in a formatted trace. This same trace captured information can also be used in accordance with an aspect of the invention to respond on behalf of a task in a reproduction environment as described further below.

In order use layer boundary points, tracing facilities 342 records data when the task continues to run, but transfers from one software layer to another. The invention can use layer boundary points to narrow problems to a specific layer of software, and to reproduce problems by calling the functions listed in the trace with the same arguments that were used when the trace was active.

A layer boundary point (LBP) is useful to show how one layer of software drives another layer of software. In accordance with a feature of the invention, the tracing and reproductions facility is not only capable of capturing the arguments and return code from a layer of software, but it is also capable of driving a software layer using the layer boundary points. Trace information captured for a layer boundary point preferably contains both the arguments transferred as part of the change of control and the return code (when a transfer function finishes) of any transfer function between two layers of software. The information for a LBP preferably contains all arguments (which are identified as 'in', 'out', or 'in/out') for a called function.

In accordance with an embodiment of a tracing feature of the invention, there is provided a tracing mechanism for adapting software to be investigated about the software's control, boundary and event points, as desired.

The mechanism comprises an interface such as four types of trace functions or macros: TraceCBoundary( . . . ); TraceABoundary( . . . ) TraceLBoundary( . . . ) and TraceEvent ( . . . ) to capture information to a trace buffer. These functions are described further herein below. The tracing mechanism is useful to define a portion of tracing and reproduction facility 340, for example.

In accordance with an embodiment of the reproduction feature of the invention, there is provided a reproduction mechanism that can read information captured by the tracing mechanism, call functions with the arguments listed from the trace information from LBP trace points and potentially respond on behalf of ACBP or SCBP trace points.

The following lines of exemplary pseudo-code illustrate an implementation of the interface to the tracing mechanism and the reproduction mechanism for adapting an exemplary synchronous control point of software to be investigated. In this exemplary case, the control point to be investigated is an operation (send) to send data to a remote resource and an operation (recv) to receive a reply.

```
if ( ! SCBPTraceRespond )
{
  // only send the data if we are not trying to respond
  if ( SCBPTraceCapture )
  {
    // Capture the data about to be sent
    TraceCBoundary( TRACE_REQUEST_SEND,
```

-continued

```
                DATA( buf, bufLen, TYPE_DATA_REQUEST_1 ) ) ;
    }
    rc = send( fd, buf, bufLen, 0 ) ;
    ...
}
else
{
    // Check with the reproduction facility that data wanted to send is in
    the buffer
    rc = TraceCBoundaryRespondCheck( TRACE_REQUEST_SEND,
                DATA( buf, bufLen, TYPE_DATA_REQUEST_1 )
    ) ;
}
// only recv the data if we are not trying to respond
if ( ! SCBPTraceRespond )
{
    rc = recv( fd, buf, bufLen, 0 ) ;
    ...
    if ( SCBPTraceCapture )
    {
        // Capture the recv'd data
        TraceCBoundary( TRACE_REQUEST_RECV,
                DATA( buf, bufLen, TYPE_DATA_REQUEST_1 ) ) ;
    }
}
else
{
    // Fill the data buffer 'buf' with the data from the trace, not from the
    server
    rc = TraceCBoundaryRespondFill( TRACE_REQUEST_RECV,
                DATA( buf, bufLen, TYPE_DATA_REQUEST_1 )
    ) ;
}
```

Figure 5:
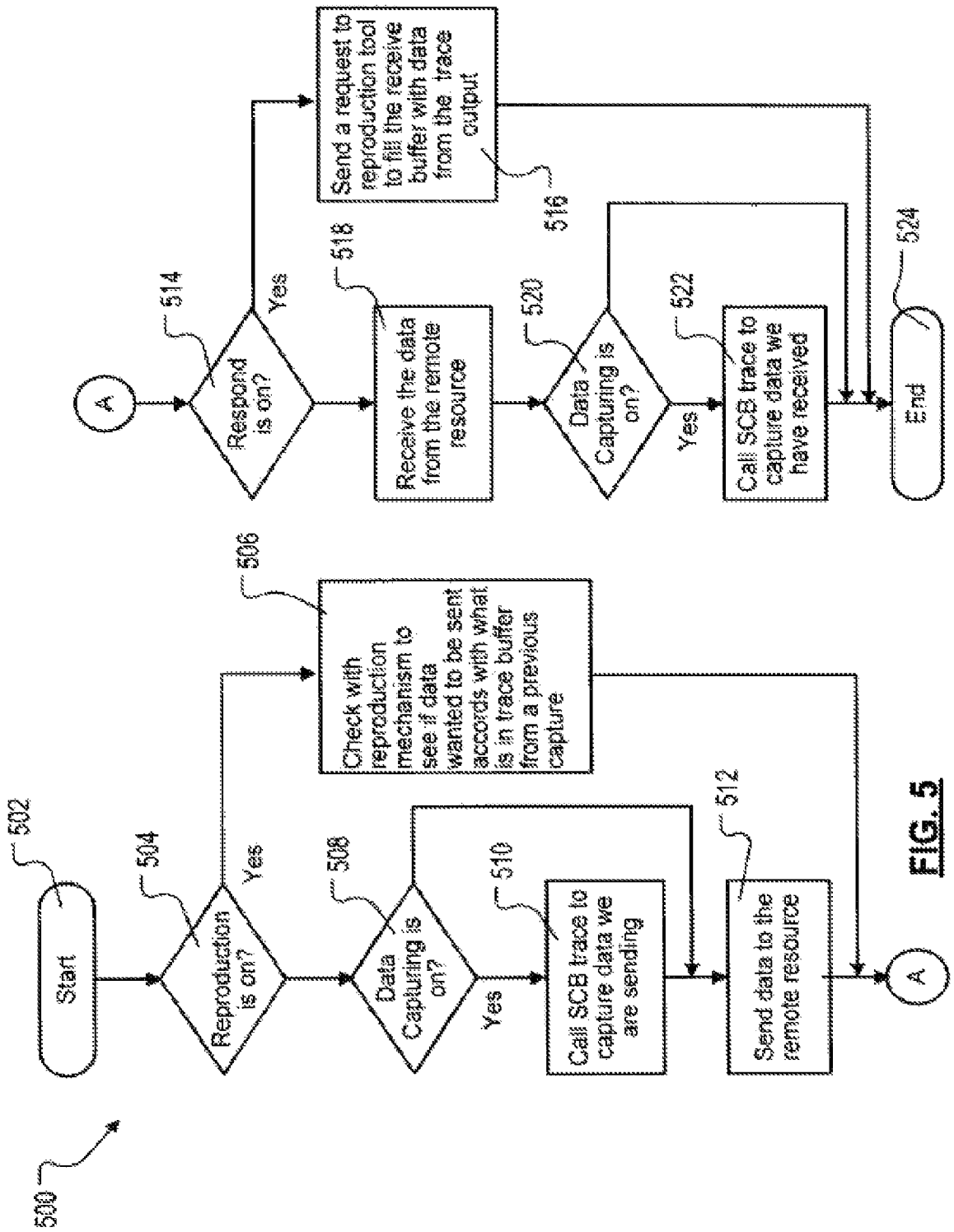
FIG. 5 is a flowchart illustrating the operations to be executed by the processing system of FIG. 2, the operations for exemplary synchronous control of boundary points.

FIG. 5 is a flowchart illustrating the operation of the above pseudo-code to be executed by the processing system of FIG. 2 (for exemplary synchronous control of boundary points). During execution of software adapted about the send and recv synchronous control boundary points such as set forth above, execution of the code about the point begins (Step 502). The code checks whether the reproduction feature is active or not (Step 504). If it is active, the send code from the software to be investigated is ignored (i.e. by-passed). A request is sent to the reproduction mechanism to determine whether the data wanted to be sent is in the trace buffer, i.e. accords with what was previously captured (Step 506).

If the reproduction feature is not active, then a determination is made whether the tracing feature to capture information is active (Step 508). If it is active, the interface for tracing a SCBP is called with the appropriate arguments to capture the desired information for the trace point (Step 510). At step 512, the specific trace point (send) from the software is executed.

Following the send operation or the by-pass, at step 514 a determination may be made whether the reproduction feature is active. If so, a request is sent to the reproduction mechanism to simulate the behavior of the remote resource by obtaining trace information previously captured and placing it in an expected buffer to simulate the recv. Otherwise, at step 518, the control point recv is executed and a determination at step 520 is made whether this information is to be traced. If yes, at step 522, the information is captured via a SCBP interface to the tracing mechanism. Operations then or otherwise end (Step 524).

Figure 6:
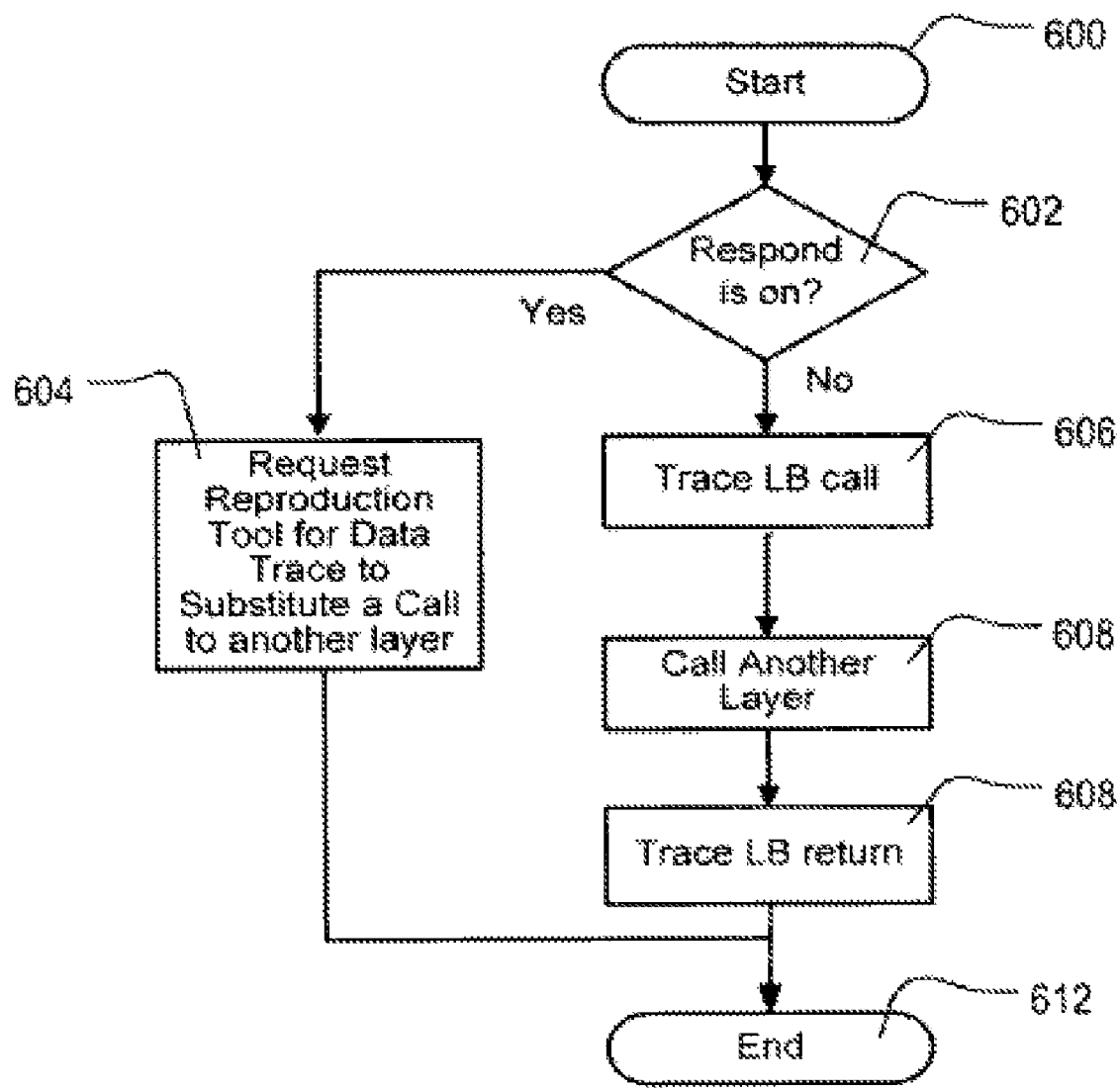
FIG. 6 is a flowchart illustrating operations to be executed by the processing system of FIG. 2, the operations for tracing an exemplary layer boundary trace point; and, FIG. 7 is a schematic block diagram illustrating interaction of a tracing and reproduction facility, included within the operations of FIG. 3, with components of a relational database management system.

FIG. 6 is a flowchart illustrating operations for tracing an exemplary layer boundary trace point exemplified in the following pseudo-code (to be executed by the processing system of FIG. 2). Those skilled in the art will appreciate the operations to reproduce traced layer boundary point from the following code:

```
if ( ! LBPTraceRespond )
{
    TraceLBoundaryCall( TRACE_FUNC_foo,
                ARG( 1, &a, sizeof(a), TYPE_INT, IN ),
                ARG( 2, b, strlen(b), TYPE_NULL_TERM_STRING,
                OUT ) );
    rc = foo( int a, char *b ) ;
    TraceLBoundaryReturn( TRACE_FUNC_foo,
                ARG( 2, b, strlen(b), TYPE_NULL_TERM_STRING,
                OUT )
                RET( rc ) );
    ...
}
else
{
    // Check against the data sent in the trace. In arguments are checked
    against the trace, out arguments are filled with the data from the trace
    rc = TraceLBoundaryFakeCall( TRACE_FUNC_foo,
                ARG( 1, &a, sizeof(a), TYPE_INT, IN ),
                ARG( 2, b, strlen(b), TYPE_NULL_TERM_STRING,
                OUT ),
                RET( rc ) );
}
```

Code about the point begins execution (Step 600) and a determination is made whether the reproduction feature is active (Step 602). If so, then a request is made via an interface to the reproduction mechanism to obtain information obtained from a prior trace instance (Step 604). If reproduction is not active, The layer boundary point may be traced (step 606) and the layer point executed to call another layer (step 608). The return may also be traced (step 612) before ending. Optionally, though not shown, the layer point 608 need not be traced. Further, code for reproducing the traced point may also be omitted.

If the software to be investigated is multi-threaded software, such as RDBMS 300, uses some form of contexts, connection pools or multiple processes, to distinguish similar traced points from one another in a trace buffer the information from the trace points may contain sufficient information to identify a particular process/thread/context. Also, a form of unique identifier may be flowed through the various context or connection pooling changes in order to facilitate a correlation between a call and the resulting activity it generated. In the case of a multi-threaded client application (e.g. 302), for example, it would be impossible in some cases to know which interaction with the server (e.g. RDBMS 300) was caused by which thread unless the thread ID was included in the trace. For a multi-context application, it would be impossible in some cases to know which context was causing an interaction with the server unless the context information was included in the trace. Consider the following example where the only function for a software layer is:

LookupNameGivenPhoneNumber(char *piPhoneNumber, char *poName);

In the following example, two exemplary threads are traced:

1. CALL: LookupNameGivenPhoneNumber( "555-1234" (in), 0x2341ECF (out) )
2. CALL: LookupNameGivenPhoneNumber( "555-3453" (in), 0xEDFC234 (out) )
3. SendRequestToServer( buf = { NUM_TO_NAME, "555-1234" } ) = 0
4. ReceiveResponseFromServer( buf = { NAME_FROM_NUM, "John Smith" } ) = 0

-continued

```
5. SendRequestToServer( buf = { NUM_TO_NAME, "555-3453" } ) = 0
6. ReceiveResponseFromServer( buf = { NAME_FROM_NUM, "Kathy Jones" } ) = 0
7. RETURN: LookupNameGivenPhoneNumber( "555-1234" (in), "John Smith" (out) ) = OK
8. RETURN: LookupNameGivenPhoneNumber( "555-3453" (in), "Kathy Jones" (out) ) = OK
```

The information captured by a trace can be interpreted to understand which specific captured data is associated with which thread. However, this would require adding specialized coding to the trace and/or reproduction mechanisms. Sufficient information to identify the trace point instance for correlation may include a process ID, thread ID and, potentially, the context ID of the function scope to reduce coding requirements. A thread ID facilitates ensuring that the various trace functions can be associated with the original interface function calls. The following example illustrates the capture of the process ID (e.g. 3244) and thread ID (e.g. 1 or 2) for facilitating identification.

Figure 7:
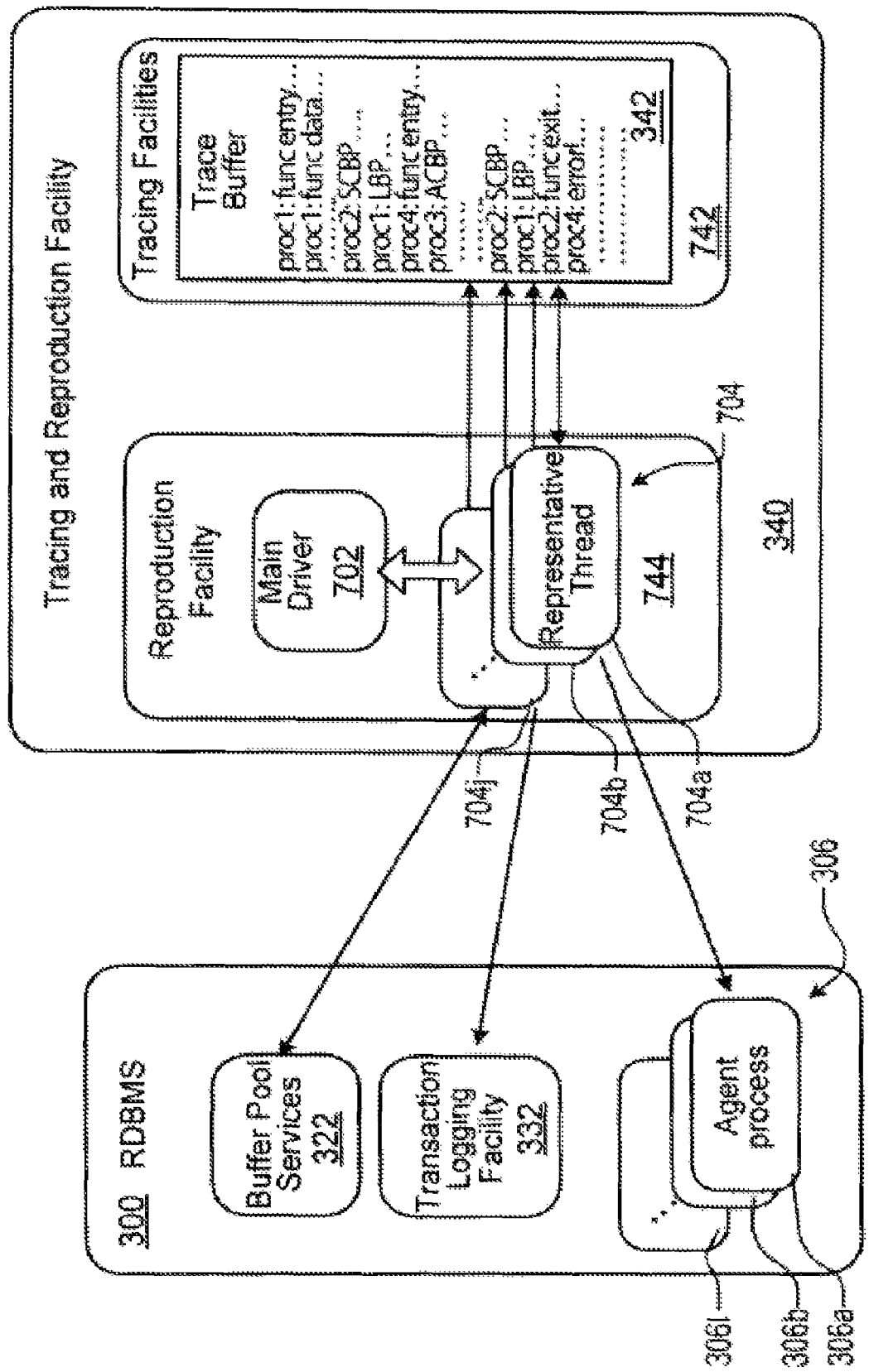

In addition to providing a tracing feature, the present invention provides a reproduction feature to reproduce behavior of software at a control or boundary point from information captured during trace operations at such a respective point. FIG. 7 is a schematic block diagram illustrating interaction of tracing and reproduction facility 340 (included within operations of FIG. 3) with components of RDBMS 300 in an exemplary embodiment of the invention to illustrate the reproduction feature. Tracing and reproduction facility 340 in this exemplary embodiment comprises tracing facility 742 including trace buffer 342 and reproduction facility 744. Reproduction facility 744 is configured as a multi-threaded problem recreation utility (MPRU) having a main driver 702 which maintains a pool of representative threads 704a, 704b, . . . 704j (collectively 704) for processing captured information for various threads, for example, various threads of a client application (not shown), various agent process threads (collectively 306), threads of buffer pool service 322 or transaction logging facility 332. A set of functions (not shown) (e.g. TraceCBoundaryRespondFill) facilitates a reading or interpretation of the trace point information for the

```
1. CALL: LookupNameGivenPhoneNumber( "555-1234" (in), 0x2341ECF (out) ):      3244: 1
2. CALL: LookupNameGivenPhoneNumber( "555-3453" (in), 0xEDFC234 (out) ):      3244: 2
3. SendRequestToServer( buf = { NUM_TO_NAME, "555-1234" } ) = 0:              3244: 1
4. ReceiveResponseFromServer( buf = { NAME_FROM_NUM, "John Smith" } ) = 0 : 3244: 1
5. SendRequestToServer( buf = { NUM_TO_NAME, "555-3453" } ) = 0:              3244: 2
6. ReceiveResponseFromServer( buf = { NAME_FROM_NUM, "Kathy Jones" }) = 0 : 3244: 2
7. RETURN: LookupNameGivenPhoneNumber( "555-1234" (in), "John Smith" (out) ) = OK : 3244: 1
8. RETURN LookupNameGivenPhoneNumber( "555-3453" (in), "Kathy Jones" (out) ) = OK : 3244: 2
```

Additional information may be required in the case of connection pooling and/or thread contexts. The above example may be adapted to capture a thread context (and where it was switched for thread #2):

representative thread and may respond on behalf of a traced function instead of calling that function.

MPRU main driver 702 is adapted to read information from the trace buffer, for example, sequentially trace point by trace

```
1. CALL: LookupNameGivenPhoneNumber( "555-1234" (in), 0x2341ECF (out) )          : 3244: 1: 0xFFFFBED0
2. CALL: LookupNameGivenPhoneNumber( "555-3453" (in), 0xEDFC234 (out) )          : 3244: 2: 0xFFFEBED0
3. SWITCH CONTEXT: pid 3244: thread 2 : 0xFFFEBED0 -> 0xFFFDBED0
4. CALL: LookupNameGivenPhoneNumber( "555-3453" (in), 0xEDFC234 (out) )          : 3244: 2: 0xFFFDBED0
5. SendRequestToServer( buf = { NUM_TO_NAME, "555-1234" } ) = 0                  : 3244: 1: 0xFFFFBED0
6. ReceiveResponseFromServer( buf = { NAME_FROM_NUM, "John Smith" } ) = 0        : 3244: 1: 0xFFFFBED0
7. SendRequestToServer( buf = { NUM_TO_NAME, "555-3453" } ) = 0                  : 3244: 2: 0xFFFDBED0
8. SWITCH CONTEXT: pid 3244: thread 2 : 0xFFFDBED0 -> 0xFFFEBED0
9. SendRequestToServer( buf = { NUM_TO_NAME, "555-3453" } ) = 0                  : 3244: 2: 0xFFFEBED0
10. ReceiveResponseFromServer( buf = { NAME_FROM_NUM, "Kathy Jones" })      = 0  : 3244: 2: 0xFFFEBED0
11. SWITCH CONTEXT: pid 3244: thread 2 : 0xFFFEBED0 -> 0xFFFDBED0
12. ReceiveResponseFromServer( buf = { NAME_FROM_NUM, "Kathy Jones" })      = 0  : 3244: 2: 0xFFFDBED0
13. RETURN: LookupNameGivenPhoneNumber( "555-1234" (in), "John Smith" (out) ) = OK    : 3244: 1: 0xFFFFBED0
14. RETURN LookupNameGivenPhoneNumber( "555-3453" (in), "Kathy Jones" (out) ) = OK : 3244: 2: 0xFFFDBED0
15. SWITCH CONTEXT: pid 3244: thread 2 : 0xFFFDBED0 -> 0xFFFEBED0
16. RETURN LookupNameGivenPhoneNumber( "555-3453" (in), "Kathy Jones" (out) ) = OK : 3244: 2: 0xFFFEBED0
``` point. When driver 702 determines one or more trace points that require a representative thread (704) (or context) to represent the trace points, driver 702 submits the information for the trace points to an existing representative thread 704 maintained by driver 702 or first creates such a thread 704. The representative thread is then woken up and instructed to process the trace points represented by the information in the trace. A representative thread could call a specific function on behalf of the original thread from which the information in the trace was captured or respond on behalf of a trace function that the traced thread called.

If we use the threaded trace example from above, the following are the actions that would be taken for each trace point:

A. A main thread (i.e. driver 702) would set the "respond" flag for the trace. For a single process or thread trace, this flag would be process or thread specific accordingly. For a multiple process trace, the flag may be stored in shared memory or some other shared resource.

B. The main thread 702 would read the first trace record from buffer 342.

1. CALL: LookupNameGivenPhoneNumber("555-1234" (in), 0x2341ECF (out)): 3244: 1

C. The main thread 702 would spawn a representative thread #1 704*a* to represent thread #1 from the trace.

D. Worker thread #1 704*a* would go to sleep and wake for work.

E. The main thread 702 would submit the trace point to worker thread #1 704*a* to be processed.

F. The main thread 803 would wake up worker thread #1 704*a*.

G. Worker thread #1 704*a* would call: "LookupNameGivenPhoneNumber("555-1234" (in), 0x2341ECF (out))"

H. Worker thread #1 704*a* would continue to run until the function completed or until it encountered a "respond trace point" or an error. If it encountered a respond trace point such as TraceCBoundaryRespondCheck( ) or TraceCBoundaryRespondFill, the thread 704*a* would go to sleep and wait for the next trace point to be submitted.

I. Main thread 702 would read trace point #2:

2. CALL: LookupNameGivenPhoneNumber("555-3453" (in), 0xEDFC234 (out)): 3244: 2

J. Main thread 702 would spawn a second worker thread (a.k.a. a representative thread) #2 704*b* to represent thread #2.

K. Worker thread #2 704*b* would go to sleep and wake for work.

L. The main thread 702 would submit the trace point to worker thread #2 704*b* to be processed.

M. The main thread 702 would wake up worker thread #2 704*b*.

N. Worker thread #2 704*b* would call: "LookupNameGivenPhoneNumber("555-1234" (in), 0x2341ECF (out))"

O. Worker thread #2 704*b* would continue to run until the function completed or until it encountered a "respond trace point". If it encountered a respond trace point such as TraceCBoundaryRespondCheck( ) or TraceCBoundaryRespondFill, the thread would go to sleep and wait for the next trace point to be submitted.

P. The main thread 702 would read trace point #3.

3. SendRequestToServer(buf={NUM_TO_NAME, "555-1234"})=0: 3244: 1

Q. The main thread 702 would submit the trace point to worker thread #1 704 to be processed.

R. The main thread 702 would wake up worker thread #1. At this point, thread #1 704*a* should be waiting on a TraceCBoundaryRespondCheck( ) call for the SendRequestToServer. Thread #1 704*a* would wake up and check the function against the function in the trace to ensure that they match. If they do not match, the trace behavior is different and the reproduction utility 744 would exit with an error message. If the function that the thread 704*a* is waiting on and the function in the trace information match, the thread 704*a* would return the same return code that the SendRequestToServer returned in the trace but it would not send any data to the server. The thread #1 704*a* would now continue until the LookupNameGivenPhoneNumber function completed, or until another response point is hit.

S. Main thread 702 would read trace point #4

4. ReceiveResponseFromServer(buf={NAME_FROM_NUM, "John Smith"})=0: 3244: 1

T. Main thread 702 would submit the trace point to worker thread #1 704*a* to be processed.

U. Main thread 702 would wake up worker thread #1 704*a*. At this point, thread #1 704*a* should be waiting on the TraceCBoundaryRespondFill( ) call for the ReceiveResponseFromServer function. Thread #1 704*a* would wake up and check the function against the function in the trace to ensure that they match. If they do not match, the trace behavior is different and the utility 744 would exit with an error message. If the function that the thread is waiting on and the function in the trace match, thread 704*a* would fill the arguments that were passed back from the server given the data from the trace, and return the same error code as the ReceiveResponseFromServer function. Thread #1 704*a* would now continue until the LookupNameGivenPhoneNumber function completes or until another response point is hit. According to the trace, the LookupNameGivenPhoneNumber will complete. If this function completes, thread #1 704*a* will keep trace of the arguments that were returned and the return code that was returned, and will wait for the main thread 702 to submit the corresponding trace point.

V. The main thread 702 would read trace point #5.

5. SendRequestToServer(buf={NUM_TO_NAME, "555-3453"})=0: 3244: 2

W. The main thread 702 would submit the trace point to worker thread #2 704*b* to be processed.

X. The main thread 702 would wake up worker thread #2 704*b*. At this point, thread #2 704*b* should be waiting on the TraceCBoundaryRespondCheck( ) call for the SendRequestToServer function. Thread #2 704*b* would wake up and check the function against the function in the trace to ensure that they match. If they do not match, the trace behavior is different and the utility would exit with an error message. If the function that the thread 704*b* is waiting on and the function in the trace match, the thread 704*b* would return the same return code that the SendRequestToServer returned in the trace, but it would not send any data to the server. The thread #2 704*b* would now continue until the LookupNameGivenPhoneNumber function completed or until another response point is hit.

Y. The main thread 702 would read trace point #6.

6. ReceiveResponseFromServer(buf={NAME_FROM_NUM, "Kathy Jones"})=0: 3244: 2

Z. The main thread 702 would submit the trace point to worker thread #2 702*b* to be processed.

AA. The main thread 702 would wake up worker thread #2 704*b*. At this point, thread #2 704*b* should be waiting on the TraceCBoundaryRespondFill( ) call for the ReceiveResponseFromServer function. Thread #2 704*b* would wake up and check the function against the function in the trace to ensure that they match. If they do not match, the trace behavior is different and the utility 744 would exit with an error message. If the function that the thread 704b is waiting on and the function in the trace match, the thread would fill the arguments that were passed back from the server given the data from the trace, and return the same error code as the ReceiveResponseFromServer function. The thread #2 would now continue until the LookupNameGivenPhoneNumber function completes or until another response point is hit. According to the trace, the LookupNameGivenPhoneNumber will complete. If this function completes, thread #2 704b will keep trace of the arguments that were returned and the return code that was returned, and wait for the main thread to submit the corresponding trace point.

AB. The main thread 702 would read trace point #7.

7. RETURN: LookupNameGivenPhoneNumber("555-1234" (in), "John Smith" (out))=OK: 3244: 1

AC. The main thread 702 would submit the trace point to worker thread #1 704a to be processed.

AD. Worker thread #1 704a would now compare the actual output arguments and the actual return code for the function with those from the trace to ensure that they match. If they match, it would go back to sleep and wait for more trace points to process.

AE. The main thread 702 would read trace point #8

8. RETURN LookupNameGivenPhoneNumber("555-3453" (in), "Kathy Jones" (out))=OK: 3244: 2

AG. The main thread 702 would submit the trace point to worker thread #2 704b to be processed.

AH. Worker thread #2 704b would now compare the actual output arguments and the actual return code for the function with those from the trace to ensure that they match. If they match, it would go back to sleep and wait for more trace points to process.

The respond functionality is actually easy to implement since the same arguments and return code from the trace will apply. It is more difficult to implement the function calling part of the utility. Calling a function may be implemented by a piece of code that follows the procedure calling convention for the platform the traced function is running on. Because of this, there is no easy way to call a generic function and pass the appropriate arguments into such a generic function. There are two ways to deal with this. The first is to use special support for each function for which an implementation of the invention has support. For example, the trace may have captured the following trace point for the function foo (the part of this formatted trace point before the '=' sign would come from the TraceLBoundaryCall trace function or macro while the part after the '=' sign would come from the TraceLBoundaryReturn trace function or macro):

```
foo(5, "hello" ) = 65
    The source code around function 'foo' may look something like
    this:
TraceLBoundaryCall( TRACE_FUNC_foo,
            ARG( 1, &a, sizeof(a), TYPE_INT, IN ),
            ARG( 2, b, strlen(b), TYPE_NULL_TERM_STRING,
                 OUT ) );
    rc = foo( int a, char *b ) ;
    TraceLBoundaryReturn( TRACE_FUNC_foo,
                RET( rc ) );
```

The first argument would be of type "integer", the second argument would be of type "null terminated string" and the return code is always an "integer". The invention would likely use one or more switch statements to find the correct function support and would then turn the generic data into the required arguments for the function 'foo'.

```
switch ( FunctionID )
{
    case TRACE_FUNC_foo :
    {
        int a ;
        char *foo ;
        a = (int) *( (int *) arg1 ) ;
        b = (char * ) arg2 ;
        foo( a, b ) ;
    }
    break ;
}
```

The other way is to write dynamically modifying code. This is obviously more difficult than the first method, although code that modifies itself is not uncommon and it is extremely flexible.

Either way, the MPRU utility would continue to process the trace, handing trace points to the worker threads as appropriate until: the problem is reproduced; the trace file is exhausted; or until the user stops the utility or until the utility determines an error or mismatch in the trace.

In addition to tracing boundary and layer points to capture information to reproduce behavior, descriptive information identifying a state of a traced point may be collected. In accordance with an embodiment, state descriptive information may be described using a state switch having a predetermined basic structure illustrated below in pseudo-code:

```
typedef struct stateSwitch {
    Uint action;
    Uint flags;
    Uint dataType;
    size_t dataSize;
    void *data;
} stateSwitch_t;
```

The action member may represent one of a plurality of predetermined values which each correspond to one specific action selected from the set of predetermined actions, such as "waiting for a read from a socket", "authenticating user", "waiting on a wait/post area", etc. The flags member may represent various bit-wise information about whether the current running action is blocking, working, interruptible, etc. The dataType member contains a value that describes the type of data associated with the current action. If the thread or process is reading from a socket, the dataType member can state that the data for the progress switch is a socket identifier, or more detailed information about the socket. The dataSize member contains the size of the data for the progress switch. The data member may comprise a pointer to the data for the progress switch. This could point to any type of information including complex structures or simple identifiers. Ideally, if the thread or process is waiting for another thread, process, or other system, the data member would point to information that not only describes the resource that the thread or process is waiting for, but also provide information that describes the other thread, process or other system. If a software product is hung, a special utility can be used to gather the progress switches for all of the threads and/or processes of the software product. This utility can form a tree of dependencies that could isolate circular dependencies (i.e. a dead lock), or a specific thread or process that is causing the entire software product to hang. Depending on why such a thread or process is hanging, it may be possible to resolve the problem and allow the software product to continue. Otherwise, the invention would still provide valuable information for problem determination.

The embodiment(s) of the invention described above is(are) intended to be exemplary only. The scope of the invention is therefore intended to be limited solely by the scope of the appended claims.

What is claimed:

1. An article of manufacture for directing a data processing system to investigate computer software, the article comprising: a computer readable storage medium embodying one or more executable data processing system instructions, the executable data processing system instructions comprising:
    executable data processing system instructions for determining whether one or more boundary points of the computer software is one of a layer boundary point, a synchronous control boundary point, and an asynchronous control boundary point;
    executable data processing system instructions for capturing tracing information at the one or more boundary points of the computer software in response to the determining;
    executable data processing system instructions for reproducing a behavior of the computer software at the one or more boundary points based on the captured tracing information;
    executable data processing system instructions for interpreting the captured tracing information to distinguish individually traced boundary points among the one or more boundary points;
    in response to the determining that the one or more boundary points is the layer boundary point, executable data processing system instructions for defining the tracing information in response to zero or more arguments and a return code for each function defining the layer boundary point of said one or more boundary points; and
    in response to the determining that the one or more boundary points is the synchronous boundary point or the asynchronous boundary point, executable data processing system instructions for defining the tracing information in response to at least one of data sent and data received across the synchronous control boundary point or the asynchronous control boundary point of said one or more boundary points.

2. The article of manufacture of claim 1 further comprising:
    executable data processing system instructions for adapting said computer software about said one or more boundary points, the adapted computer software being usable by a tracing mechanism.

3. The article of manufacture of claim 1 further comprising:
    executable data processing system instructions for capturing state information describing a state of action of said computer software at each boundary point; and executable data processing system instructions for placing the captured state information in a data structure.

4. The article of manufacture of claim 1, wherein the reproducing the behavior of said computer software occurs at the one or more boundary points in response to tracing information captured for the one or more boundary points.

5. The article of manufacture of claim 1 further comprising:
    executable data processing system instructions for creating a representative pool of workers to represent boundary points in the trace information; and
    executable data processing system instructions for submitting trace information for a boundary point to a respective worker to process the trace information.

6. The article of manufacture of claim 5 further comprising executable data processing system instructions for defining one or more functions for facilitating the pool of workers to process the trace information.

7. A data processing system for investigating computer software, the data processing system comprising:
    a processor coupled to a memory;
    a determining module, executed on the processor, for determining whether one or more boundary points of the computer software is one of a layer boundary point, a synchronous control boundary point, and an asynchronous control boundary point;
    a tracing module for capturing, in the memory, tracing information at the one or more boundary points of the computer software in response to the determining;
    a reproducing module reproducing a behavior of the computer software at the one or more boundary points based on the captured tracing information;
    an interpreting module for interpreting the captured tracing information to distinguish individually traced boundary points among the one or more boundary points;
    a defining module for defining, in response to the determining that the one or more boundary points is the layer boundary point, the tracing information in response to zero or more arguments and a return code for each function defining the layer boundary point of said one or more boundary points, and in response to the determining that the one or more boundary points is the synchronous boundary point or the asynchronous boundary point, the defining module defines the tracing information in response to at least one of data sent and data received across the synchronous control boundary point or the asynchronous control boundary point of said one or more boundary points.

8. The data processing system of claim 7 further comprising an adaptor module for adapting said computer software about said one or more boundary points, the adapted computer software being usable by the tracing module.

9. The data processing system of claim 7 further comprising: a capturing module for capturing state information describing a state of action of said computer software at each boundary point; and a placing module for placing the captured state information in a data structure.

10. The data processing system of claim 7, wherein the reproducing the behavior of said computer software at the one or more boundary points occurs in response to tracing information captured for the one or more boundary points.

11. The data processing system of claim 7 further comprising:
    a creating module for creating a representative pool of workers to represent boundary points in the trace information; and
    a submitting module for submitting trace information for a boundary point to a respective worker to process the trace information.

12. The data processing system of claim 11 further comprising a defining module for defining one or more functions for facilitating the pool of workers to process the trace information.

* * * * *